June 21, 1932.　　　　E. T. FRANKEL　　　　1,864,056
CALCULATING DEVICE
Filed April 14, 1931　　2 Sheets-Sheet 1

INVENTOR
Edward T. Frankel
BY
ATTORNEYS

June 21, 1932.  E. T. FRANKEL  1,864,056
CALCULATING DEVICE
Filed April 14, 1931  2 Sheets-Sheet 2
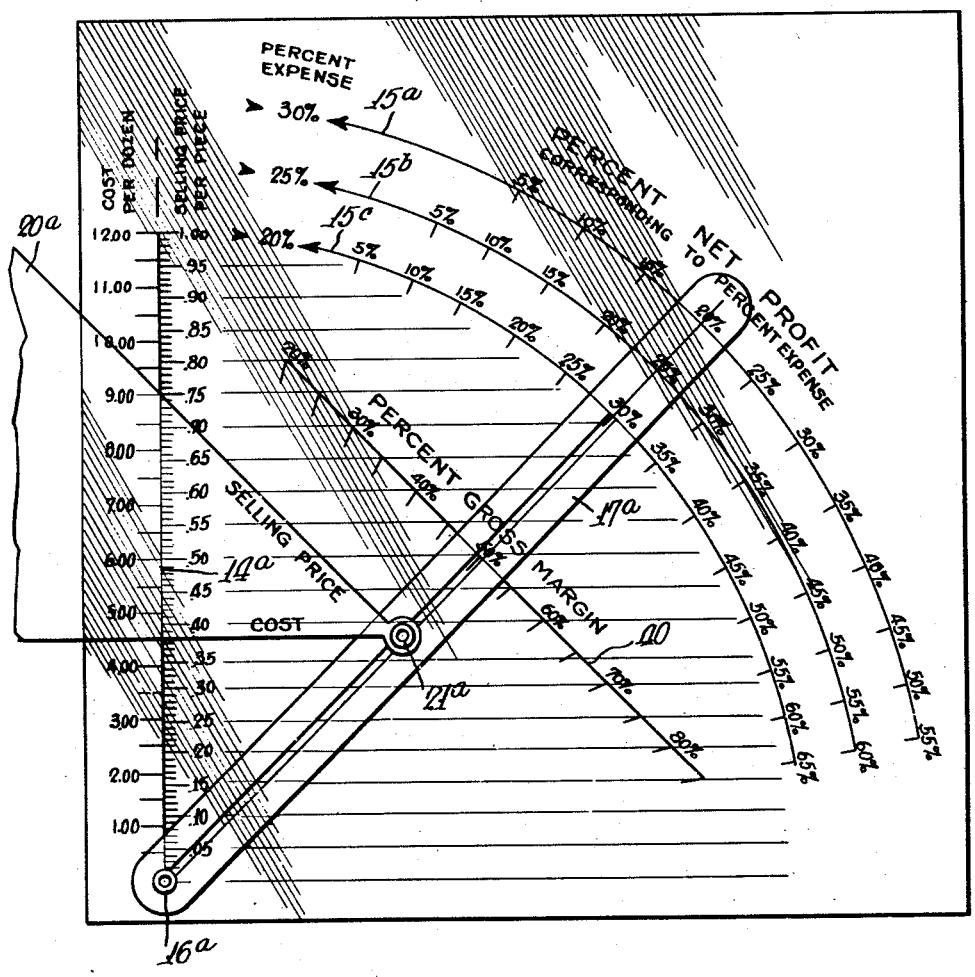

Patented June 21, 1932

1,864,056

UNITED STATES PATENT OFFICE

EDWARD T. FRANKEL, OF NEW YORK, N. Y.

CALCULATING DEVICE

Application filed April 14, 1931. Serial No. 529,922.

My present invention is concerned with a calculating device capable of a wide and varied range of utility, particularly in the computation of proportions or percentages and finds one of its preferred embodiments in a calculating device with which speculators or investors in securities may determine at a glance their marginal percentage.

An object of the invention is to provide a calculating device which will indicate unknown percentages accurately and quickly when the two factors which determine such percentages are known. In the case of a marginal percentage, these known factors are of course, the market value of the stock and the amount of money owed to the broker.

Another object is to provide a device of this character of simple, rugged, durable, inexpensive construction well suited to the requirements of economical manufacture.

Another object is to provide a device of this character which will give a direct reading of the percentage to be determined upon a simple, selective manual setting of one of the movable elements of the calculator, and which is capable of embodiment in a compact simple construction.

In accordance with one embodiment of the invention, the device includes a chart having a pair of scales delineated thereon. The movable devices are provided, one having a portion to read on one scale and the other having a pair of reading lines or edges fixed relatively to each other and giving two readings on the other scale. The two movable members, the latter of which preferably constitutes an actuating device for the former, are so interconnected that the correct setting of any two reading lines or edges to register known quantities, will move the third reading member into position to indicate the third quantity or factor to be determined.

More specifically, the chart has a straight scale graduated in terms of known sums or known quantities. Pivoted at one end of the straight scale is an indicator arm, the free end of which is adapted to coact with a reading scale calibrated in terms of percentages. A forty-five degree corner of a transparent movable triangle is pivotally and slidably connected to the pointer arm. When this triangle is adjusted so that its lower horizontal edge intersects one of the known quantities on the vertical scale, and its 45° edge intersects another of the known quantities, the pointer will automatically show on the reading scale the desired percentage between such quantities.

It will thus be seen that the device is particularly well suited for calculating margin interest in securities owned. By simply adjusting the triangle so that its lower edge reads on the amount of money owed to a broker and its other "setting" edge intersects an indication of the market value of the securities, the pointer will automatically give the marginal percentage.

The invention may be more fully understood from the following description in connection with the accompanying drawings, wherein:—

Fig. 4 is a view similar to Fig. 3 but illustrating a modified form of the invention adapted for calculating the margin of gross and net profit in transactions where the purchase price, selling price and selling expense are known.

Figure 1:
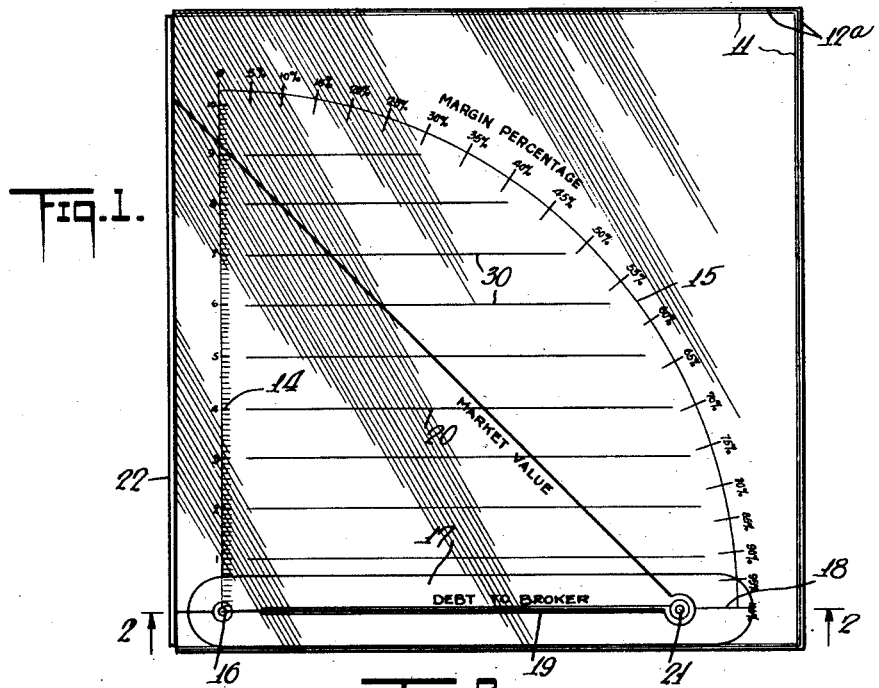
Fig. 1 is a plan view of a calculating device embodying the present invention, showing the same in its normal folded condition.
Figure 2:
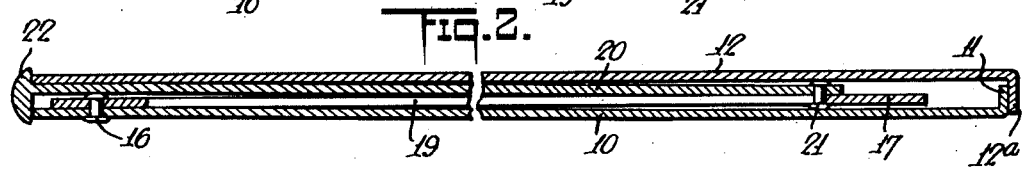
Fig. 2 is a transverse sectional view on the line 2—2 of Fig. 1.

Referring with particularity to the drawings, I have used the reference character 10 to designate a backing plate or the like upon which the chart portion of the calculating device is printed or otherwise displayed. The chart bearing backing plate may be approximately square as illustrated and at three edges thereof is provided with raised flanges, such as 11 adapted to overlap and be secured to similar pendant flanges 12a of a transparent top plate 12. The backing plate and top plate form in effect an envelope having a transparent top and open at one side.

The chart may be of generally triangular or sectoral conformation having a straight bottom side 13 and a straight vertical graduated side 14 constituting radii of the same circle and connected by an arcuate calibrated reading line 15, the center of this arc being coincident with the intersection of lines 13 and 14 at the lower left hand corner of the chart. Pivoted in such corner upon a rivet 16 or other suitable device is an indicating arm 17 of transparent material having a reading line 18 at its free end adapted to coact with the graduations on the arcuate scale.

The transparent arm 17 is provided with an elongated slot 19 therein and the arm is actuated by a transparent rectangular isoceles triangle 20 having one of its 45° corners pivotally and slidably connected to the slot in the arm by a rivet or equivalent device 21.

The triangle 20 which actuates the transparent arm 17 is provided at one edge with an integral flange 22 which abuts the free edges of the casing or envelope defined by the chart carrying plate 10 and its transparent cover 12.

The vertical side 14 of the chart is graduated in terms of known sums, illustratively from zero to $10,000.00, while the arcuate side is graduated in percentages from zero to 100%. The chart is provided with a suitable number of horizontal lines 30, which serve as guides to aid in keeping the lower edge of the triangle parallel with the bottom of the chart when performing a calculation. The reason that the marks on the percentage scale are not spaced uniform distances apart is because of the arcuate shape of the scale. These percentage graduations on the arcuate scale are actually determined by projections from the center of the arc through corresponding uniformly spaced percentage graduations on any 45° line drawn parallel to the hypotenuse of the actuating triangle 20 and terminated by the bottom side 13 and the graduated side 14 of the chart.

Figure 3:
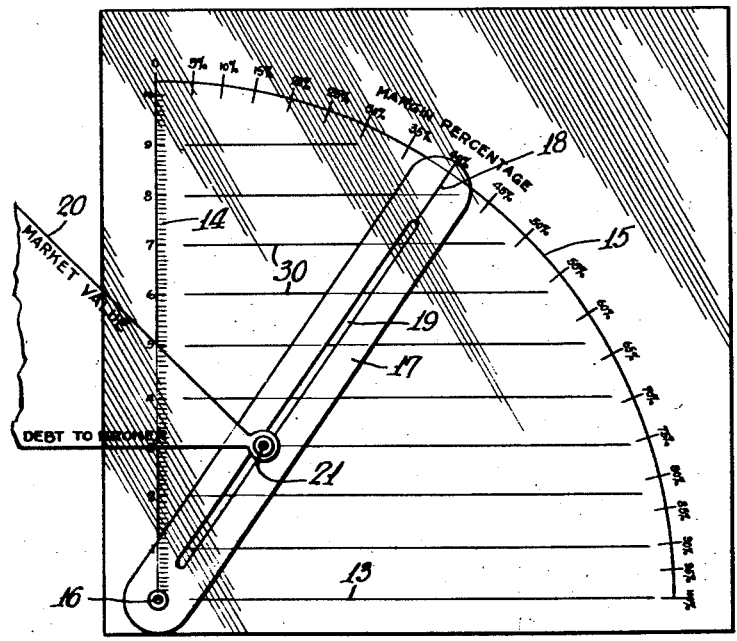
Fig. 3 is a similar view illustrating the device in one position of use for solving a proportioning problem.

One typical way in which the device may be used to solve a problem is illustrated in Fig. 3, wherein the device is shown in a position to determine the margin percentage where the debt to the broker is $3,000.00 and the market value of the stock is $5,000.00. It will be noted that the triangle has been grasped by its flanged edge and moved upwardly until its lower edge, which preferably carries the slogan "debt to broker" crosses the scale at 3. With this edge maintained at the same level, the triangle is slid to the left until its hypotenusal edge (preferably carrying the slogan "market value") crosses the scale at 5. The pointer or indicator arm now indicates that the margin percentage is 40%.

It will be apparent that the device may be used for making other calculations. For instance, assume that a rising market had raised the value of the securities to $6,000.00. A new calculation would show that the new margin percentage was 50%. If it was advisable to use the additional equity for increased holdings and still maintain a 40% margin, the amount of new commitments possible could be quickly determined as follows:

After placing the "debt to broker" edge at 3, and the "market value" edge at 6, the triangle is moved vertically upward until the pointer reaches 40%. The "debt to broker" edge then reads $4500.00, the "market value" reads $7500.00, thereby indicating that $1500.00 can be used for new commitments, still leaving a 40% equity in all of the stocks owned.

It should be evident that an instrument embodying the invention could be suitably graduated in any terms desired for making proportional calculations of various kinds.

Also, without departing from the mechanical construction of the device, its sphere of action can be further broadened by substituting two adjacent, differently graduated scales in place of the single scale 14 heretofore described, one scale to be read in connection with the hypotenuse, the other scale in connection with the lower edge of the sliding triangle, while instead of a single arcuate scale there may be a plurality of such scales parallel to each other, each being independently graduated according to a different function of the readings on the said two adjacent scales.

In Fig. 4 I have illustrated a modified form of the invention in which the same principle of operation is utilized. Here the vertical scale 14a corresponding to the scale 14 is provided with two sets of graduations, one set representing the cost per dozen or other unit of merchandise and the second representing the selling price per unit. The scale marks of the two sets of graduations project from opposite sides of the common vertical reading line. A triangle 20a corresponding to the triangle 20 has its hypotenusal edge provided with the legend "Selling price" and is adapted to be set upon the selling price scale, while the lower horizontal ledge of this triangle bears the legend "Cost" and is adapted to be read upon the cost scale. That corner of the triangle 14a defined by the intersection of the setting edges is pivotally and slidably connected as at 21a to an indicator arm 17a pivoted at the zero end of the vertical scale by means of the rivet 16a.

The free end of the arm 17a is adapted to read upon any one of a plurality of arcuate scales 15a—15b or 15c. These arcuate scales are graduated in terms of net profit and, at the end of each scale, there is designated the percentage of expense incurred in connection with the sale of the merchandise, it being obvious, of course, that the particular cost of selling as well as the difference between cost price and selling price is a determining factor in the percentage of profit. In addition to the scales 15a, 15b and 15c and preferably inwardly thereof, I may provide a scale 40 indicating the percentage of gross margin or gross profit. This scale is disposed at a 45 degree angle to the vertical scale and its graduations correspond to the graduations of the scale 15 of Fig. 3.

The manner of use of the form of calculator shown in Fig. 4 will be substantially obvious. As shown in the drawings, the calculator is set to indicate the percentage of gross and net margin, where goods have been purchased for $4.50 a dozen and sold for $.75 a piece. Obviously, the selling price will be $9.00 a dozen, the gross margin will be 50%, and if the selling expense has been 20%, the net profit will be 30%, i. e. 30% of $9.00. Correspondingly, if the cost of selling has been 25 or 30%, the percentage of net profit will be 25 or 20%.

It is to be understood that the so-called percentage of net profit is based upon the calculations now commonly used by retailers in which they consider as a net profit, the percentage of profit to the sales price and not the percentage of profit to the purchase price of the goods. If desired, however, scales indicating the latter may also be provided.

It will also be evident that this scale may be used for making numerous other calculations, that is to say, when the percentage of selling expense is known and the purchase price is known, one may readily calculate the price at which the goods must be sold to return any desired percentage of net profit.

Obviously, it is a matter of simple mathematics to graduate the vertical scale 14a in terms of cost per thousand or cost per any other arbitrary unit and to graduate the selling price portion of the scale in terms of dozens or the like.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In a calculating device of the class described, a chart carrying member displaying a straight scale graduated in terms of certain quantities, an indicator arm pivoted at one end of the scale, a second scale with which the free indicating end of said arm is adapted to coact, an actuating member for the indicating arm having a straight lower edge adapted to be maintained at right angles to the first mentioned scale and an edge disposed at 45° to said lower edge, both of said edges being adapted to register with known quantities on the first mentioned scale, said actuating member at the corner where the said edges intersect being pivotally and slidably connected to said indicator arm, whereby as the actuating member is shifted into setting position with respect to the first mentioned scale, the end of the indicator arm is moved into reading position on the second mentioned scale.

2. In a calculating device of the class described, a chart carrying member displaying a straight scale graduated in terms of known quantities, an indicator arm pivoted at one end of the scale, a second scale with which the free indicating end of said arm is adapted to coact, an actuating member for the indicating arm having a straight lower edge adapted to be maintained at right angles to the first mentioned scale and an edge disposed at 45° to said lower edge, both of said edges being adapted to register with known quantities on the first mentioned scale, said actuating member at the corner where said edges intersect being pivotally and slidably connected to said indicator arm, whereby as the actuating member is shifted into setting position with respect to the first mentioned scale, the end of the indicator arm is moved into reading position on the second mentioned scale, said chart being provided with a plurality of lines at right angles to the first mentioned scale and between the scales to assist in manually setting the lower edge of the actuating member at right angles to the first mentioned scale.

3. In a calculating device of the class described, a chart carrying member displaying a straight common scale graduated at opposite sides in terms of different units, an indicator arm pivoted at one end of the scale, a second scale with which the free indicating end of said arm is adapted to coact, an actuating triangular member for the indicating arm having a straight lower edge adapted to be maintained at right angles to the first mentioned scale and an edge disposed at 45° to said lower edge, said edges being adapted to register respectively with known quantities expressed in different units on the first mentioned scale, said actuating member at the corner where said edges intersect being pivotally and slidably connected to said indicator arm, whereby as the triangle is shifted into setting position with respect to the first mentioned scale, the end of the indicator arm is moved into reading position on the second mentioned scale, said second mentioned scale being graduated in terms of percentages to indicate proportions between the known quantities which the setting edges of the triangle intersect on the first scale.

4. A device as described in claim 1 and wherein a transparent cover member cooperates with the chart bearing member to define an envelope, and a handle means are provided on the actuating member accessible at and normally closing the open side of the envelope.

5. A device as described in claim 1 and wherein a transparent cover member cooperates with the chart bearing member to define an envelope, and a flange integral with the actuating member is adapted to abut the edges of said envelope at the open side of the latter and limit inward movement of the actuating member into the envelope.

6. In a calculating device of the class described, a chart carrying member displaying a straight scale graduated in terms of known quantities, an indicator arm pivoted at one end of the scale, a second scale with which the free indicating end of said arm is adapted to coact, a right angle isoceles triangle having one of its 45° corners slidably and pivotally connected to the indicator arm, one of the edges of said triangle being adapted to be maintained at right angles to the first mentioned scale and to be set with respect to the graduations thereof, the hypotenusal edge of said triangle being also adapted to register with said scale, the indicator arm acting to indicate on the second mentioned scale a mathematical function of the percentage between the two quantities with which the two setting edges of the triangle are in registration.

7. In a calculating device of the class described, a chart carrying member displaying a straight scale graduated in terms of known quantities, an indicator arm pivoted at one end of the scale, a second scale with which the free indicating end of said arm is adapted to coact, a right angle isoceles triangle having one of its 45° corners slidably and pivotally connected to the indicator arm, one of the edges of said triangle being adapted to be maintained at right angles to the first mentioned scale and to be set with respect to the graduations thereof, the hypotenusal edge of said triangle being also adapted to register with said scale, the indicator arm acting to indicate on the second mentioned scale the complement of the percentage between the two quantities with which the two setting edges of the triangle are in registration, said triangle being transparent and acting automatically when moved to setting position to shift the indicator arm to reading position.

8. In a calculating device of the class described, a chart carrying member displaying a straight scale graduated in terms of known quantities, an indicator arm pivoted at one end of the scale, a second scale with which the free indicating end of said arm is adapted to coact, a right angle isoceles triangle having one of its 45° corners slidably and pivotally connected to the indicator arm, one of the edges of said triangle being adapted to be maintained at right angles to the first mentioned scale and to be set with respect to the graduations thereof, the hypotenusal edge of said triangle being also adapted to register with said scale, the indicator arm acting to indicate on the second mentioned scale a percentage relationship between the two quantities with which the two setting edges of the triangle are in registration, a transparent cover for the chart bearing member defining therewith an envelope open on three sides and a flange on the third non-reading edge of the triangle, adapted to abut and seal the open side of the envelope, said flange constituting a handle for moving the triangle to setting position.

9. In a proportion calculating device, a chart bearing member, having a straight scale displayed thereon and graduated in terms of known quantities, an indicating arm pivoted at the zero end of the scale, a second scale graduated in terms of proportions and with which the free end of the indicating arm is adapted to register, a triangle pivotally and slidably connected to the indicating arm and including a pair of setting edges adapted for registration with the first mentioned scale.

10. In a proportion calculating device, a chart bearing member, having a straight scale displayed thereon and graduated in terms of known quantities, an indicating arm pivoted at the zero end of the scale, a second scale graduated in terms of proportions and with which the free end of the indicating arm is adapted to register, a triangle pivotally and slidably connected to the indicating arm and including a pair of setting edges adapted for registration with the first mentioned scale, said triangle being transparent and of right angular isoceles shape, means on the chart to facilitate the maintenance of one edge of the triangle at right angles to the straight scale, the hypotenusal edge of the triangle constituting the other reading edge thereof.

11. In a proportion calculating device, a chart bearing member, having a straight scale displayed thereon and graduated in terms of known quantities, an indicating arm pivoted at the zero end of the scale, a second scale graduated in terms of proportions and with which the free end of the indicating arm is adapted to register, a triangle pivotally and slidably connected to the indicating arm and including a pair of setting edges adapted for registration with the first mentioned scale, said triangle being transparent and of right angular isoceles shape, means on the chart to facilitate the maintenance of one edge of the triangle at right angles to the straight scale, the hypotenusal edge of the triangle constituting the other reading edge thereof, the non-reading edge being flanged constituting a finger grip to facilitate manipulation of the triangle.

12. In a proportion calculating device, a chart bearing member, having a straight scale displayed thereon and graduated in terms of known quantities, an indicating arm pivoted at the zero end of the scale, a second scale graduated in terms of proportions and with which the free end of the indicating arm is adapted to register, a triangle pivotally and slidably connected to the indicating arm and including a pair of setting edges adapted for registration with the first mentioned scale, said triangle being transparent and of right angular isoceles shape, means on the chart to facilitate the maintenance of one edge of the triangle at right angles to the straight scale, the hypotenusal edge of the triangle constituting the other reading edge thereof, the non-reading edge being flanged constituting a finger grip to facilitate manipulation of the triangle, a transparent cover spaced above the chart bearing member and between which the triangle and the chart bearing arm are movable, said flange abutting the cover when the parts have been shifted to their extreme position.

13. In a device of the class described, a chart bearing member having a straight scale graduated in terms of known quantities, an indicator arm pivoted at the zero end of the scale and a second scale with which the second end of said arm coacts, graduated in terms of known proportions, an actuating member for the indicating arm having a pair of setting edges and said actuating member being shiftable to bring said reading edges into simultaneous coaction with the two known quantities, whose relative proportions are to be determined.

14. In a calculating device of the class described, a chart having a pair of scales displayed thereon, a pair of pivotally and slidably members to coact with and read upon the respective scales, one member including a single reading portion to coact with one scale and the other member including a pair of relatively fixed reading edges to coact with the other scale.

15. In a calculating device of the class described, a chart having a pair of scales displayed thereon, a pair of members to coact with and read upon the respective scales, one member including a single reading portion to coact with one scale and the other member including a pair of relatively fixed reading edges to coact with the other scale, said members being operatively pivotally and slidably interconnected.

16. In a calculating device of the class described, a chart having a pair of scales displayed thereon, a pair of members to coact with and read upon the respective scales, one member including a single reading portion to coact with one scale and the other member including a pair of relatively fixed reading edges to coact with the other scale, one of said members being pivotally, slidably connected to and constituting an operating means for the other.

17. In a calculating device of the class described, a chart having a pair of scales displayed thereon, a pair of members to coact with and read upon the respective scales, one member including a single reading portion to coact with one scale and the other member including a pair of relatively fixed reading edges to coact with the other scale, said members being operatively interconnected, said relatively fixed reading edges being movable to register with any pair of graduations on their associated scale.

18. In a calculating device of the class described, a chart having a pair of scales displayed thereon, a pair of members to coact with and read upon the respective scales, one member including a single reading portion to coact with one scale and the other member including a pair of relatively fixed reading edges to coact with the other scale, the first member comprising an arm pivoted at the zero end of one scale and having a free end reading on the other scale, said second member comprising a triangle pivotally and slidably connected at one corner to the arm, two edges of said triangle constitute reading edges and forming said corner.

19. In a calculating device of the class described, a chart having a pair of scales displayed thereon, a pair of members to coact with and read upon the respective scales, one member including a single reading portion to coact with one scale and the other member including a pair of relatively fixed reading edges to coact with the other scale, the first member comprising an arm pivoted at the zero end of one scale and having a free end reading on the other scale, said second member comprising a triangle, two edges of which constitute reading edges, said triangle being pivotally and slidably connected to said arm at the corner defined by the reading edges of the triangle.

20. In a calculating device of the class described, a pair of straight adjacent scales graduated according to different units, a reading arm having a fixed pivot, a movable angular reading element, slidably and pivotally connected with said arm, said last mentioned element including a pair of edges adapted to read respectively upon said adjacent scales and a third scale upon which the free end of the pivoted arm is adapted to be read.

Signed at New York in the county of New York and State of New York, this 13th day of April, A. D. 1931.

EDWARD T. FRANKEL.